(12) United States Patent
Barge et al.

(10) Patent No.: US 7,327,915 B2
(45) Date of Patent: Feb. 5, 2008

(54) INTEGRATED OPTICAL STRUCTURE SENSITIVE TO THE ENERGY RADIATED INTO THE CLADDING OF A PLANAR LIGHTWAVE CIRCUIT

(75) Inventors: Daniela Barge, San Martino Siccomario (IT); Maurizio Lenzi, Novara (IT)

(73) Assignee: STMicroelectronics S.r.l., Agrate Brianza (IT)

(*) Notice: Subject to any disclaimer, the term of this patent is extended or adjusted under 35 U.S.C. 154(b) by 7 days.

(21) Appl. No.: 11/195,354

(22) Filed: Aug. 2, 2005

(65) Prior Publication Data
US 2006/0045411 A1 Mar. 2, 2006

(30) Foreign Application Priority Data
Aug. 3, 2004 (EP) .................................. 04425598

(51) Int. Cl.
G02B 6/26 (2006.01)
(52) U.S. Cl. ............................. 385/30; 385/14; 385/39; 385/43; 385/48; 385/50
(58) Field of Classification Search ................. 385/14, 385/129, 130, 132, 30, 45
See application file for complete search history.

(56) References Cited

U.S. PATENT DOCUMENTS

| | | | | |
|---|---|---|---|---|
| 4,515,428 A * | 5/1985 | Findakly | ....................... | 385/46 |
| 4,998,793 A | 3/1991 | Henry et al. | ............. | 350/96.15 |
| 5,252,513 A | 10/1993 | Paoli et al. | .................. | 437/129 |
| 5,818,989 A * | 10/1998 | Nakamura | .................... | 385/45 |
| 5,917,972 A * | 6/1999 | Davies | ......................... | 385/43 |
| 6,201,913 B1 * | 3/2001 | Yi et al. | ....................... | 385/42 |
| 6,434,296 B1 * | 8/2002 | Lupu et al. | .................. | 385/30 |
| 6,661,949 B1 * | 12/2003 | James et al. | .................. | 385/30 |
| 6,954,568 B2 * | 10/2005 | Liu | .............................. | 385/45 |
| 7,076,125 B2 * | 7/2006 | Kouta et al. | .................. | 385/14 |

(Continued)

FOREIGN PATENT DOCUMENTS

EP    0 996 055 A1    4/2000

(Continued)

OTHER PUBLICATIONS

Whalen, M., et al., "Effectively Nonreciprocal Evanescent-Wave Optical-Fibre Directional Coupler," *Electronics Letters*, 21(5):175-176, Feb. 28, 1985.

*Primary Examiner*—Sung Pak
*Assistant Examiner*—Chad H. Smith
(74) *Attorney, Agent, or Firm*—Lisa K. Jorgenson; Ronald Stern; Seed IP Law Group PLLC

(57) ABSTRACT

The described integrated planar optical structure comprises a principal waveguide having a core and a cladding that define a first light path ad means sensitive to the light radiated into the cladding comprising at least one secondary waveguide having a core and a cladding that define a second light path. The secondary waveguide has an entry situated in the cladding of the principal waveguide at such a distance from the core of the latter as not to interfere with the propagation of the light along the first optical path and a core section that becomes greater in a first part from the entry onwards to collect the light energy radiated into the cladding. Also described are a system for monitoring the light energy emitted by a source and an optical attenuator that comprise the aforesaid optical structure.

23 Claims, 2 Drawing Sheets

U.S. PATENT DOCUMENTS

| | | | |
|---|---|---|---|
| 2002/0067892 A1 | 6/2002 | Oguro | 385/49 |
| 2003/0035449 A1 | 2/2003 | Tomlinson et al. | 372/29.02 |
| 2004/0047537 A1* | 3/2004 | Boord et al. | 385/14 |

FOREIGN PATENT DOCUMENTS

| | | | |
|---|---|---|---|
| EP | 0996005 A1 | * | 4/2004 |
| NL | EP0996005 A1 | * | 4/2000 |
| WO | WO 03/100490 A1 | | 12/2003 |

* cited by examiner

INTEGRATED OPTICAL STRUCTURE SENSITIVE TO THE ENERGY RADIATED INTO THE CLADDING OF A PLANAR LIGHTWAVE CIRCUIT

BACKGROUND OF THE INVENTION

1. Field of the Invention

The present invention relates to optical circuits realized by means of planar technology and, more particularly, to an integrated planar optical structure.

2. Description of the Related Art

A typical field of application of planar lightwave circuits (PLC) is constituted by optical communication systems, inclusive of the modern transmission systems that exploit wavelength division multiplexing (WDM or DWDM). The greater part of the optical devices necessary for the transport and processing of the light signals, such as amplifiers, modulators, attenuators and so forth, are realized as planar integrated lightwave circuits.

In a planar lightwave circuit the propagation path of the light is defined by a core obtained from a layer, known as the core layer, comprised between two cladding layers. The materials are chosen in such a manner as to obtain a refraction index of the core layer greater than that of the cladding layers and to render possible the total reflection of the light to be transmitted.

Typically, planar lightwave circuits are fabricated by utilizing the techniques commonly employed for the fabrication of integrated electronic circuits, such as the deposition of layers of different or differently doped materials and photolithographic processing. In a known process a first layer of silicon dioxide with a predetermined type and/or concentration of dopant is deposited on a silicon substrate. In this way one obtains the lower cladding layer. The next step is the deposition of the core layer. In this case it consists once again of silicon dioxide, but with a dopant type and/or concentration different from those of the first layer. This is followed by the deposition of photoresist and the formation of a photolithographic mask in accordance with the layout of the proposed circuit. The next step is an attack to etch the core layer in the areas not protected by the mask. After the photoresist mask has been removed, there remain the cores that will constitute the lightwave circuit. The final step consists of the deposition of a second and last cladding layer (upper cladding layer). This last layer consists once again of silicon dioxide and has the same dopant as the first layer. The refraction indices are established in the design phase by appropriately choosing the dopant type and concentration of the core layer and the cladding layers. In this way one also defines the effective refraction index of the circuit, which, depends on the geometry of the designed waveguide and the difference between the refraction index of the core and that of the cladding. With its core and the part of the cladding adjacent to the core, a waveguide defines an optical path. A light signal applied to the entry of the waveguide becomes propagated along the light path as guided energy, but, due to the effect of dispersion, is also partly radiated into the cladding.

In a communication system it is important that the transmitted signal should remain as unaltered as possible, i.e., as free from attenuation as possible. Obviously, it is impossible for the signal not to become disturbed by noise or not to be subject to power reductions, so that whenever the optical path is very long, several kilometers for example, the output signal may be altered and greatly attenuated. With a view to obviating this drawback, there are provided not only such optical devices as amplifiers or repeaters, but also monitoring systems that make it possible to have information about the state of the light signal at the beginning and the end of the optical path and also along its course.

A typical case is the monitoring of the light energy emitted by a laser source coupled directly to an optical device realized with planar waveguides and intended to be transmitted by means of, for example, a single-mode optical fiber. The laser source is mounted in the vicinity of the entry of a waveguide. The light energy enters the waveguide and, in a typical case, passes through a section of the waveguide to reach a WDM (Wavelength Division Multiplexer) structure capable of separating a signal associated with the light energy into components of different wavelengths. The components then continue in optical fiber through the subsequent network architecture.

A technique for monitoring the useful power of the light beam emitted by the laser source envisages the introduction of a collector device between the source and the beginning of the optical fiber. The device directly collects a fraction of the useful power and sends it to a photodiode connected to appropriate processing equipment. But this technique introduces a loss, because it calls for the removal of a fraction of the useful power that should enter the optical fiber. This loss has to be added to the others already present, such as, for example, the loss due to laser alignment errors. It is extremely difficult, if not altogether impossible, to align the laser in such a way that 100% of the light beam will enter the waveguide. In actual practice the light, already at the beginning, is partly directed into the waveguide and partly radiated into the cladding of the PLC and therefore lost. It is estimated that laser alignment problems cause the dispersion of almost 50% of the power of the emitted signal. Another difficulty is due to the spectral behavior of the WDM structure, possibly integrated in the PLC, which nominally should be independent of the emission wavelength of the source, though this is not so in actual fact. While it functions, the laser source is subject to temperature variations that imply mechanical dilations of the sources and modify the wavelength of the emitted light. The WDM structure responds differently every time that the wavelength varies following a variation of the temperature.

In the case here described the energy radiated into the cladding of a PLC constitutes a loss that has to be taken into account in the design of a communication network. In other applications the energy radiated into the cladding is a desired dispersion in order to comply with the design specifications of an optical device. For example, the optical parameters of a waveguide may be chosen in such a manner that, at a given frequency, the waveguide will permit only the propagation of the fundamental mode, while all the other modes, known as evanescent modes, are dispersed into the cladding. Even in the attenuation devices a part of the signal that arrives as input is propagated as guided energy in the core and a part is radiated into the cladding and dispersed.

A device of this latter type, known as a variable optical attenuator (VOA), for use in wide-band applications with a higher attenuation is realized by connecting two Mach-Zehnder (MZ) interferometers in cascade by means of a waveguide. An MZ interferometer consists of an input Y-coupler, i.e., an optical coupler that divides the incoming light energy into two equal parts, two waveguide branches that guide the two parts of the light energy into different light paths by introducing a predetermined phase difference between the two signals and an output Y-coupler. The phase difference may be obtained by realizing two branches of different lengths or by forming two electrodes on one of the two branches and applying to them a voltage such as to modify the refraction index of the light path between the two electrodes due to thermo-optical and/or electromagnetic effects. The two signals will therefore be out of phase and will be summed in constructive or destructive interference. The output signal of the first stage is partly conveyed into the waveguide between the first and the second stage as guided energy and partly dispersed into the cladding. But the energy thus radiated into the cladding is not wholly dispersed at the output of the first stage, because a part succeeds in reaching the beginning of the second stage, so that when it eventually reaches the input Y-coupler of the second stage, it becomes once more coupled with the fundamental mode in the waveguide and is thus added to the guided energy within the light path. The attenuation of the input signal introduced by the twin stage is not therefore as expected, because the light energy lost by the first stage is partly recovered by the second. The design of the attenuator therefore becomes somewhat difficult and has to take account of this phenomenon.

A first known solution of this problem is to prolong the part of the waveguide between the two stages and therefore the distance between them. This solution has the drawback of increasing the encumbrance of the optical device.

A second known solution is to create discontinuities in the zone between the two stages in the form of trenches that partly reflect the radiated energy. This solution calls for supplementary processing to create the trenches and particular attention has to be paid to valuing the exact position of the trenches with respect to the propagation waveguide: if the hollows are too close, the propagation of the guided energy is disturbed; if they are spaced too far apart, some of the radiated energy passes the trenches and reaches the second MZ stage all the same.

Another known solution is to realize an absorption structure to be interposed between the two stages, creating trenches similar to the ones of the solution that has just been described and filling the trenches with metal or depositing a metallic structure directly on the PLC in a subsequent processing phase. In this case the drawbacks are constituted by the supplementary processing that is required and the disturbance that the metallic structure may cause to the propagation of the guided energy. Indeed, any metallic structure in the vicinity of a waveguide can excite propagation modes and become a waveguide in its turn, thereby increasing the signal interference level.

In a planar lightwave circuit (PLC) in which there are realized one or more light paths to guide the light energy of a signal applied to the circuit there is often present some energy that is radiated into the cladding and will not therefore be guided.

BRIEF SUMMARY OF THE INVENTION

Embodiments of the present invention propose an integrated planar optical structure sensitive to the energy radiated into the cladding in order to collect it without interfering with the guided energy.

This may be realized by an integrated planar optical structure comprising a principal waveguide having a core and a cladding that define a first light path for the guided propagation of light energy and a means sensitive to the light energy radiated into the cladding that comprises at least one secondary waveguide having a core and a cladding that define a second light path for the guided propagation of light energy. The secondary waveguide has an entry situated in the cladding of the principal waveguide at such a distance from the core of the latter as not to interfere, or interfere only to a negligible extent, with the propagation of the light energy along the first optical path, and a core section that becomes greater in a first part from the entry onwards.

Other embodiments of the present invention propose a system for monitoring the light energy emitted by a source, where the system utilizes a similar optical structure.

Still other embodiments of the present invention propose an optical attenuator comprising another similar optical structure.

BRIEF DESCRIPTION OF THE SEVERAL VIEWS OF THE DRAWINGS

The invention will be more readily understood from the following detailed description of some embodiments thereof, the description making reference to the attached drawings, of which.

DETAILED DESCRIPTION OF THE INVENTION

Figure 1:
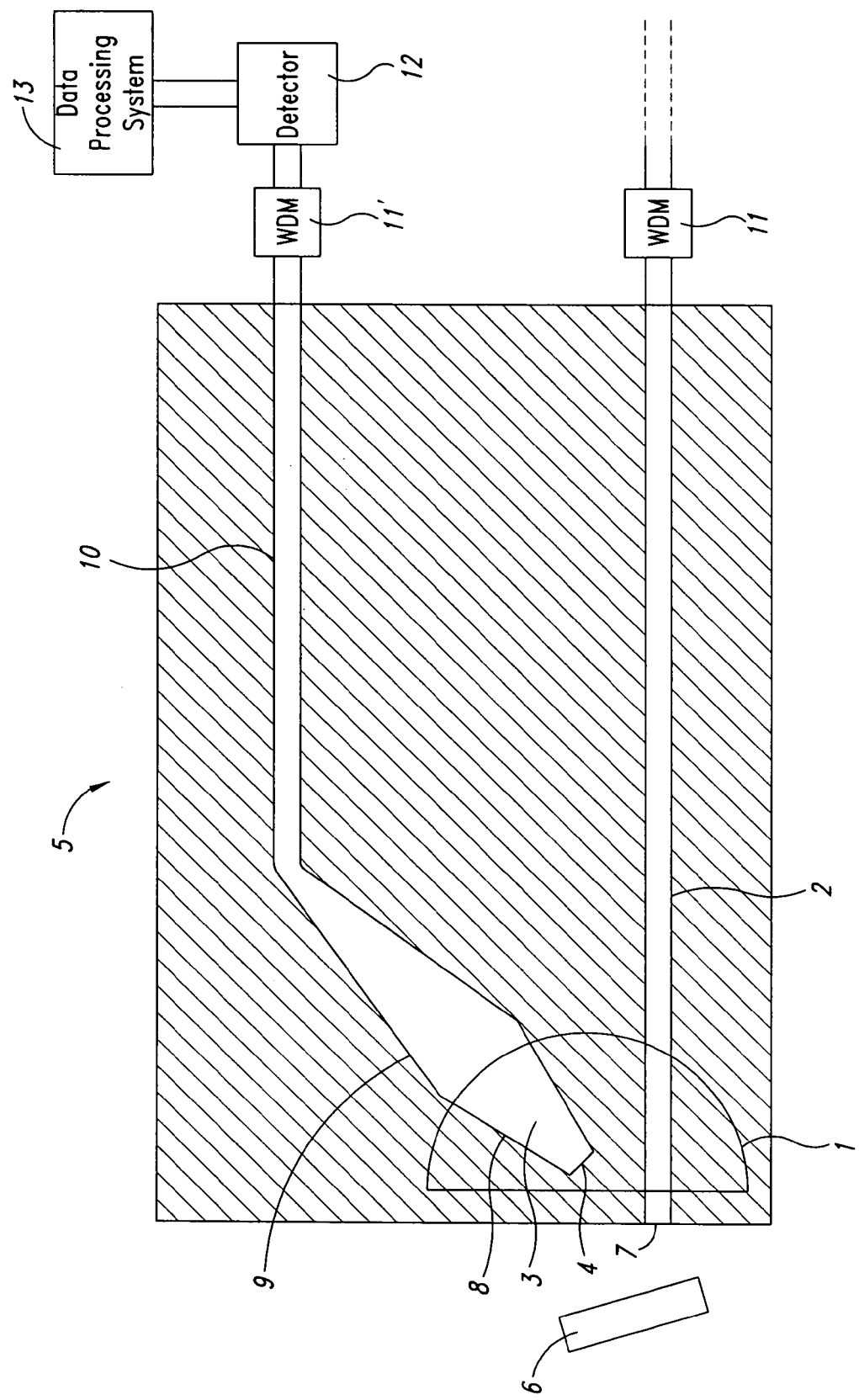
FIG. 1 shows a schematic diagram of a monitoring system comprising an integrated light circuit in which there is realized an integrated planar optical structure in accordance with an embodiment of the present invention and FIG. 2 shows a schematic diagram of a variable optical attenuator that comprises an integrated planar optical structure in accordance with an embodiment of the present invention.
Figure 2:
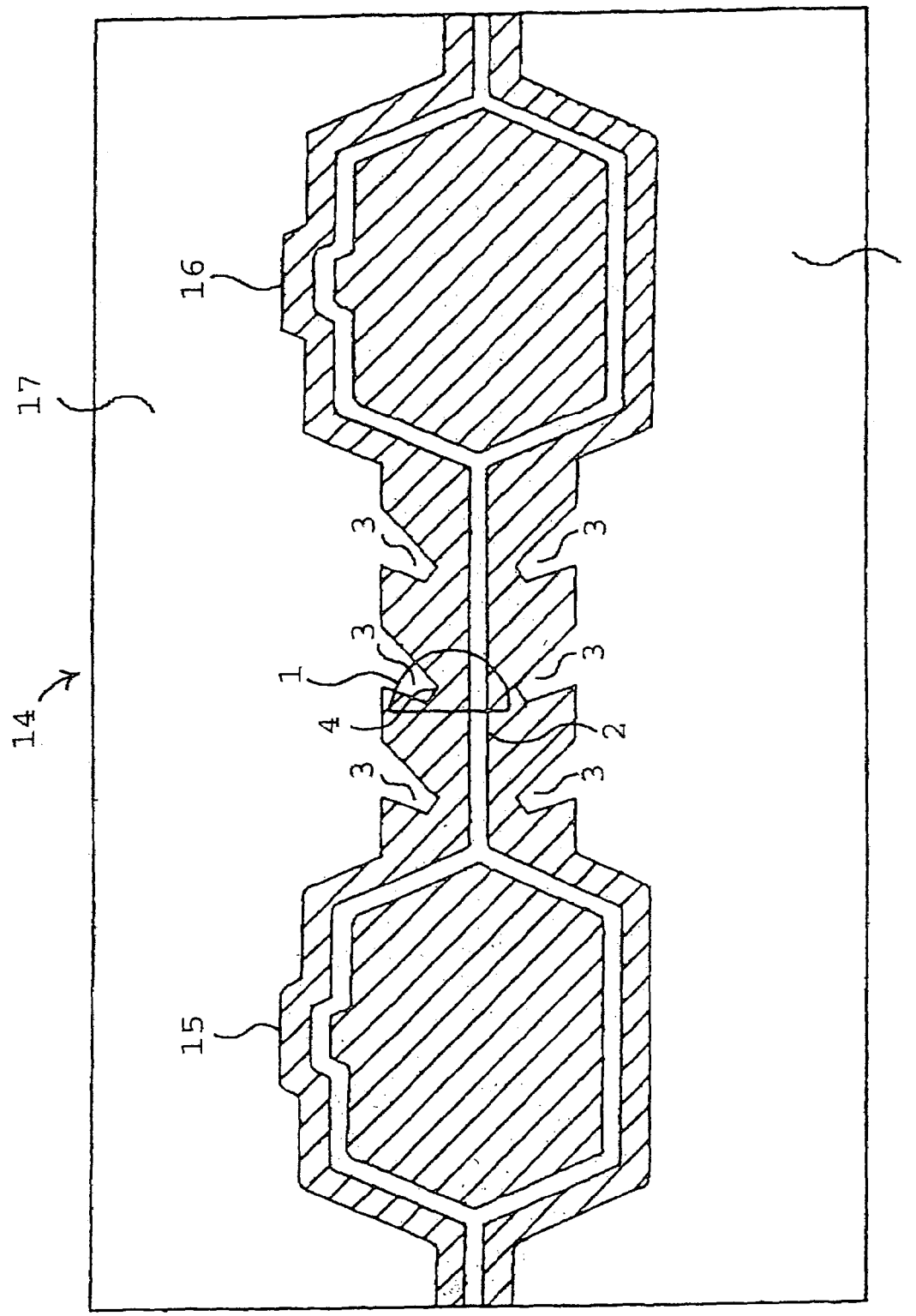

Referring to FIGS. 1 and 2, the structure in accordance with embodiments, indicated by a semicircle 1, comprises a waveguide 2 having a core and a cladding that define a light path for propagating the guided energy. With a view to facilitating comprehension of the description, the areas occupied by the cladding material have been shaded with lines inclined at 45° in both figures, while the areas occupied by core material are devoid of shading; the figures show a view from above of the structure sectioned at half the height of the layer with which the core is realized. In proximity of the waveguide 2, which we shall call the principal waveguide, there is a second waveguide 3, hereinafter called the secondary waveguide, of which the core and the cladding define a second light path that has its optical axis inclined with respect to the axis of the principal waveguide 2. The secondary waveguide 3 may be obtained by means of the same process used to obtain the waveguide 2. For this reason both the core and the cladding of the waveguides 2 and 3 may have the same indices of refraction. The secondary waveguide 3 has an entry 4 situated in the cladding of the principal waveguide 2 at a predetermined distance from the core of the latter and its core has a tapering section that enlarges from the entry. The tapering section of the waveguide 3 makes it possible to have an effective refraction index at the beginning sufficiently low not to interfere with the propagation in the waveguide 2, and also to have a gradual increase of the effective refraction index such that it may convey the collected radiated energy into the second light path without influencing the propagation of the guided energy in the principal waveguide 2.

The above-described structure in accordance with embodiments of the present invention can be used with advantage both for monitoring the transmitted power in a communication system without introducing new losses and for realizing an absorption structure to be interposed between the two stages of a variable optical attenuator.

A monitoring system, indicated overall by the reference number 5, is shown in FIG. 1. It is based on the idea of exploiting the light energy radiated from a source into the cladding in order to obtain information about the emitted light energy. A laser source 6 emits a light beam that on account of alignment errors may be partly directed towards the entry 7 of the principal waveguide 2 and partly into the cladding. The secondary waveguide 3 has a first part 8 with a tapering section, a second part 9 that commences with a section equal to the final section of the part 8 and gradually decreases until it merges with a third part 10 that has a constant section and an optical axis that are, respectively, equal and parallel to those of the waveguide 2. In this example the optical axis of the secondary waveguide 3 has a direction that substantially corresponds to the principal direction along which the light energy is propagated in the cladding. The radiated energy may be collected in the part 8, converted into guided energy in part 9 and then propagated in part 10. The output of part 10 may be coupled with a detector 12, a photodiode for example, that provides information about the energy emitted by the laser to a data processing system 13. In the illustrated example the output of the waveguide 2 may be connected by means of a waveguide or an optical fiber to a WDM structure 11. With a view to obtaining information about how the laser light beam has to be adjusted both in terms of emitted energy and in terms of laser alignment, a WDM structure, indicated by 11' and wholly equal to the WDM structure 11, may be inserted between the output of the secondary waveguide 3 and the detector 12. In this way the signal that arrives at the detector takes account of the possible effects of temperature variations of the source on the WDM structure 11.

FIG. 2 shows a PLC containing a variable optical attenuator (VOA) 14 comprising two MZ stages 15 and 16 connected in cascade. This attenuator exploits the integrated optical structure in accordance with an embodiment of the present invention as absorption structure of the energy radiated at the output of the first stage 15. The waveguide 2 may comprise a core and a cladding that define the optical path from the first stage 15 towards the second stage 16. In this application the dispersion of the radiated energy occurs on opposite sides of the waveguide 2. Two series of secondary waveguides 3, realized by means of the same process used for realizing the circuit structure of the two stages, are provided to absorb the radiated energy. For the sake of clarity, the two series of secondary waveguides 3 in FIG. 2 have been shown larger than they really are and not in scale with the rest of the circuit. Each waveguide 3 may have its optical axis inclined with respect to the axis of the waveguide 2. Preferably, the waveguides of a given series have their optical axes parallel. Each waveguide 3 may have the entry 4 arranged at a predetermined distance from the waveguide 2 and its section becomes gradually larger. For the reasons already explained, this configuration influences the effective index of refraction of the waveguides 3 in such a manner as not to disturb the propagation of the guided energy in the principal waveguide 2 and, at the same time, to assure better recovery of the energy radiated into the cladding. The two series of waveguides 3 terminate, respectively, in a region 17 and in a region 18 of the core layer at the sides of the two-stage structure. These two regions may be constituted by what remains of the core layer after the selective removal phase with which the cores of the waveguides of the circuit were formed and in this particular example extend over the whole of the remaining area of the PLC. The distance of the edges of these two regions from the principal waveguide 2 is such that the radiated energy conveyed inside them may not disturb the guided energy at the input of the second stage 16. The radiated energy that is not recuperated by one of the waveguides 3 may be collected by the subsequent waveguide of the series, and so on. The number of waveguides 3 of each series, the distance of these from the waveguide 2, the angle of inclination of the optical axis with respect to the optical axes of the waveguide 2 and the dimensioning of the tapering of each waveguide 3 can be advantageously determined by means of a simulation and optimization algorithm that will modify the aforementioned parameters until the maximum attenuation is obtained.

The proposed integrated planar structure may be sensitive to the energy radiated into the cladding of a planar light circuit (PLC) and may be capable of collecting it without interfering with the guided energy in the waveguide.

As has been seen, this structure may be inserted in a monitoring system in which the collection of the light energy is obtained without the introduction of losses and can also be utilized in an absorption structure capable of improving the decoupling between the two stages of a two-stage variable optical attenuator.

The absorption structure for both applications is obtained by means of the same working process as may be used for forming the cores of the waveguides of the PLC, so that there may be no need for supplementary processing with the greater fabrication costs and times that this implies, and the devices thus obtained are of limited encumbrance.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A planar integrated optical structure comprising:

a principal waveguide having a core and a cladding that define a first light path for the guided propagation of light energy, operable to transmit a first portion of said propagation of light energy through said core of the principal waveguide and operable to transmit a second portion of said propagation of light energy through said cladding of the principal waveguide;

means sensitive to the light energy radiated into the cladding of the principal waveguide comprising two series of secondary waveguides arranged on opposite sides of the principal waveguide, at least one of the secondary waveguides having a core and a cladding that define a second light path for the guided propagation of light energy, said at least one secondary waveguide having:

an entry situated in the cladding of the principal waveguide at such a distance from the core of the principal waveguide as not to interfere, or interfere only to a negligible extent, with the propagation of the light energy along the first light path, said entry operable to receive at least a fraction of said second portion of said propagation of light energy; and a core section that becomes greater in a first part from the entry onwards; and at least two extensive regions of the same material as the cores of the waveguides, wherein the cores of the secondary wave guides each terminate in one of the extensive regions.

2. The planar integrated optical structure in accordance with claim 1, wherein an optical axis of the first part forms an acute angle with an optical axis of the principal waveguide.

3. The planar integrated optical structure in accordance with claim 1, wherein the core of at least one secondary waveguide comprises a second part that has a decreasing section as from the end of the first part onwards.

4. The planar integrated optical structure in accordance with claim 3, wherein:
the core of the principal waveguide has a constant section;
the core of at least one secondary waveguide has a third part having a section that is constant and substantially equal to the section of the core of the principal waveguide as from the end of the second part onwards.

5. The planar integrated optical structure in accordance with claim 4, wherein:
the core of the principal waveguide extends in a straight line; and
the third part of the core of the secondary waveguide is parallel to the core of the principal waveguide.

6. A system for monitoring the light energy emitted by a source comprising:
a planar integrated optical structure including:
a principal waveguide having a core and a cladding that define a first light path for the guided propagation of light energy;
a means sensitive to the light energy radiated into the cladding of the principal waveguide comprising two series of secondary waveguides arranged on opposite sides of the principal waveguide, at least one of the secondary waveguides having a core and a cladding that define a second light path for the guided propagation of light energy, said secondary waveguide having:
an entry situated in the cladding of the principal waveguide at such a distance from the core of the principal waveguide as not to interfere, or interfere only to a negligible extent, with the propagation of the light energy along the first optical path; and
a core section that becomes greater in a first part from the entry onwards;
a detector coupled with the secondary waveguide; and
wherein the principal waveguide has an entry in a position such as to receive light energy from the source; and
at least two extensive regions of the same material as the cores of the waveguides, wherein the cores of the secondary waveguides each terminate in one of the extensive regions.

7. The monitoring system in accordance with claim 6, wherein:
the principal waveguide is connected to an optical device; and
the detector is coupled to a secondary waveguide by means of an optical device substantially equal to the optical device to which the principal waveguide is connected.

8. The monitoring system in accordance with claim 7, wherein the detector is connected to a data processing device.

9. The monitoring system in accordance with claim 6, wherein the detector is a photodiode.

10. An optical attenuator comprising:
a planar integrated optical structure including
a principal waveguide having a core and a cladding that define a first light path for the guided propagation of light energy;
a means sensitive to the light energy radiated into the cladding comprising at least one secondary waveguide having a core and a cladding that define a second light path for the guided propagation of light energy, said secondary waveguide having:
an entry situated in the cladding of the principal waveguide at such a distance from the core of the principal waveguide as not to interfere, or interfere only to a negligible extent, with the propagation of the light energy along the first optical path; and
a core section that becomes greater in a first part from the entry onwards;
wherein the means sensitive to the light energy radiated into the cladding comprise two series of secondary waveguides arranged on opposite sides of the principal waveguide; and
wherein the principal waveguide is utilized to connect two Mach-Zehnder interferometer attenuation stages in cascade.

11. The optical attenuator in accordance with claim 10, wherein the number and the geometric parameters of the secondary waveguides of each series are determined by means of a simulation and optimization algorithm.

12. A method of monitoring light energy transmitted into a planar integrated optical structure, the method comprising:
providing light energy into the planar integrated optical structure;
receiving a first portion of the light energy into a core material of a first waveguide;
receiving a second portion of the light energy into a cladding material surrounding the first waveguide; and
sampling the second portion in a manner that does not substantially interfere with the transmission of the first portion into an entrance of a second waveguide, wherein the entrance includes a junction between a core material of the second waveguide and the cladding surrounding the first waveguide,
wherein sampling the second portion further comprises:
collecting the second portion from the entrance into a first core section of the second waveguide;
propagating the second portion through the first section wherein an index of refraction associated with the first section increases as the second portion is propagated through the first section;
transmitting the second portion from the first core section into a second core section of the second waveguide; and
propagating the second portion through the second section wherein an index of refraction associated with the second section decreases as the second portion is propagated through the second section.

13. The method of claim 12 wherein the entrance of the second waveguide is arranged at a predetermined distance from the core material of the first waveguide.

14. The method of claim 12 wherein sampling the second portion further comprises:
transmitting the second portion from the second core section into a third core section; and propagating the second portion through the third section such that the second portion is propagated substantially parallel to a propagation direction of the first portion.

15. The method of claim 12 further comprising:
transmitting the second portion to a first optical device;
transmitting the first portion to a similar second optical device;
outputting the sampled portion from the first optical device to a detector; and
detecting the sampled portion with the detector.

16. A method of attenuating light energy in a planar integrated optical structure, the method comprising:
providing light energy into the planar integrated optical structure;
receiving a first portion of the light energy into a core material of a first waveguide;
receiving a second portion of the light energy into a cladding material that surrounds the core material of the first waveguide;
attenuating the second portion in a manner that does not substantially interfere with the first portion; and
wherein attenuating the second portion comprises:
receiving the second portion into an entrance of a second waveguide, wherein the entrance includes a junction between a first core section of the second waveguide and the cladding surrounding the first waveguide;
collecting the second portion from the entrance into a first core section of the second waveguide;
propagating the second portion through the first section wherein an index of refraction associated with the first section increases as the second portion is propagated through the first section;
transmitting the second portion from the first core section into a second core section of the second waveguide; and
propagating the second portion through the second section wherein an index of refraction associated with the second section decreases as the second portion is propagated through the second section.

17. The method of claim 16 wherein attenuating the second portion further comprises:
propagating the second portion through the first core section wherein an index of refraction associated with the first core section increases as the first portion is propagated through the first section.

18. The method of claim 17 wherein attenuating the second portion further comprises transmitting the second portion from the first core section into an extensive region of core material.

19. The method of claim 16 further comprises:
further attenuating the second portion in a manner that does not substantially interfere with the first portion; and
wherein further attenuating the second portion includes receiving the second portion into an entrance of a third waveguide, wherein the entrance includes a junction between a first core section of the third waveguide and the cladding surrounding the first waveguide.

20. The method of claim 19 wherein:
receiving the second portion into the entrance of a second waveguide includes receiving a portion of the second portion into the entrance of the second waveguide on a first side of the first wave guide; and
receiving the second portion into the entrance of a third waveguide includes receiving a portion of the second portion into the entrance of the third waveguide on a second side of the first wave guide.

21. The method of claim 16 further comprises:
further attenuating the second portion in a manner that does not substantially interfere with the first portion; and
wherein further attenuating the second portion includes receiving the second portion into individual entrances of an array of third waveguides, wherein each of the entrances include a junction between a first core section of a respective one of a third waveguide in the array of third waveguides and the cladding surrounding the first waveguide.

22. The method of claim 16 wherein receiving a first portion comprises:
receiving the first portion;
propagating the first portion through a first attenuation stage to the core material;
propagating the first portion through the core material to a second attenuation stage; and
propagating the first portion through the second attenuation stage.

23. The method of claim 22 wherein receiving a second portion includes partially conveying the light energy transmitted through the first attenuation stage into the cladding surrounding the core material of the first waveguide.

* * * * *